Oct. 30, 1962 A. G. NIJHUIS 3,061,055
CONNECTION OF PROFILATED POSTS AND PROFILATED
POSTS SUITED FOR THIS CONNECTION
Filed July 29, 1957 6 Sheets-Sheet 4

FIG.15<sup>a</sup>  FIG.15<sup>b</sup>  FIG.15<sup>c</sup>

AART G. NIJHUIS
BY

Oct. 30, 1962 A. G. NIJHUIS 3,061,055
CONNECTION OF PROFILATED POSTS AND PROFILATED
POSTS SUITED FOR THIS CONNECTION
Filed July 29, 1957 6 Sheets-Sheet 6

AART G. NIJHUIS
BY

United States Patent Office 3,061,055
Patented Oct. 30, 1962

3,061,055
CONNECTION OF PROFILATED POSTS AND PROFILATED POSTS SUITED FOR THIS CONNECTION
Aart G. Nijhuis, Oosterbeek, Netherlands, assignor to Alkono Aktien Gesellschaft, Chur, Switzerland, a Swiss company
Filed July 29, 1957, Ser. No. 674,637
Claims priority, application Netherlands Dec. 1, 1956
30 Claims. (Cl. 189—36)

The invention relates to a connection of profilated posts or struts and to a clamping device by which this connection is effected, whereby one support or post named the transverse post lies with its end-surface or part of its end-surface against the side of the other post named the longitudinal post and whereby at least the longitudinal post has been provided with one or more slits or holes having flanges or edges opposing each other in such a way, that the slit or hole is less wide between the flanges than at a place deeper in the slit. Furthermore the invention relates to profilated posts and post profiles which are especially suited to be used for this connection.

It is known to connect profilated posts together for some purpose or other, for example, it is known to weld, rivet or screw them together or to clamp them together in another way. These known ways to connect profilated posts have the disadvantage that the connection cannot easily be connected, disconnected, adjusted or readjusted, and especially not, when they have to be adjusted over a small distance. With these known ways of connecting profilated posts the posts are often damaged, changed or altered by riveting-holes, screw-holes welding places or the like by centerpunches, and these alterations or damages also hamper or prevent small adjustments or displacements of the connected parts and, moreover, they often detract from the esthetic appearance of the connection.

Furthermore the known manners of connecting profilated posts have the disadvantage that either the parts used for the connection are not sufficiently hidden from view and consequently the connection does not look nice and impeccable, or that these parts protrude partly out of the outer profiles of the posts and consequently not only detract from the appearance of the connection but also take up room which might be wanted for other construction purposes.

The object of the invention is to provide an easily connectable and disconnectable and easily regulable, adjustable or displaceable connection of profilated posts by means of clamping, whereby one post named the transverse post is pressed with its frontal end or part of its frontal end against a sidewall of another post, named the longitudinal post, and whereby at least the longitudinal post possesses one or more slits, slots or chambers having flanges or edges opposing each other in such a way, that at the place of the flanges or edges the slits are less wide than at a place deeper in the slit, and whereby, moreover, the parts of the clamping device belonging to the connection do not protrude outside the principal outer profiles of the profilated posts when clamped together, and whereby the connecting and/or the disconnecting or adjusting of the connection does not cause injuries or other damages to the posts, so that afterwards even a very small adjustment or displacing of the one profilated post to the other will always be possible. The clamping as well as the disconnecting of the clamping parts used for the connection can be effected from a place outside and aside the transverse support. The present invention has other advantages such as an aesthetic appearance of the connection and the invisibility of parts belonging to the clamping connection.

According to the invention this end is obtained by providing the connection with at least one clamping device comprising a clamping block and a drawbolt, which can be screwed in the said clamping block, whereby the clamping block is fully or partly placed in one or more of the above mentioned slits of the longitudinal post in such a way that parts of its may catch or hook behind the above-mentioned flanges, and whereby the head of the drawbolt presses on parts of the transverse post either directly or by means of a supporting block, the supporting block lying fundamentally inside the principally outside profile of its transverse post.

According to the invention a special feature is that all parts of the clamping device lie inside the outer profiles or at least inside the principal outer profiles, or their supposed prolongations of the two profilated posts which are clamped together. In other words, the clamping device lies entirely within the surfaces defined by the principal outer profiles. By the principal outer profile of a profilated post is understood the outer profile without taking into account the said slits or chambers, i.e. presuming that the said slits are filled up. In case, e.g., that a profilated post with a rectangular outer profile is used, whereby one or more sidewalls in their longitudinal direction have one or more slits, which are wider deeper inwards, the principal outer profile has a rectangular form.

As a consequence of the profile of the profilated posts a post has either only one single wall connecting two other walls or more than one wall connecting two other walls, and according to the invention the single connecting wall or the connecting walls of the transverse support have a hole, which has such a position and is so shaped that by means of this hole the drawbolt and/or the supporting block may be placed in its position within the headpart or endpart of the transverse post, and whereby the head of the drawbolt may be screw on from a place at the side of the transverse post. In many cases the connection according to the invention is made such that the parts of the clamping device are not only lying within the principal outer profiles or their supposed prolongations of the two profilated supports when clamped together, but that parts of the clamping device are also lying within the outer dimensions of the posts themselves, that are clamped together.

According to the invention each clamping device may have one or more draw bolts and one or more clamping devices. A preferred embodiment of the connection has two clamping devices, each having one drawbolt and one clamping block.

According to the invention it is also possible that a transverse post is clamped with its headpart surface onto more than one, e.g. two longitudinal supports simultaneously. By way of example, this will be the case when a transverse post is used as a diagonal post or strut in a framework. According to the invention the axis of the clamping bolt placed in the transverse post will generally have the same direction as the longitudinal axis of the transverse post itself, and the end surface of the transverse post or that part of the end surface that is lying against the side of a longitudinal post or is intended to lie against that side, may make any angle whatsoever with the axis of the drawbolt and, therefore, with the longitudinal axis of the transverse post in question. If the clamping connection serves to clamp together two profilated posts only, the angle in question will mostly be 90°.

The profiles of the profilated posts may be divided into two groups, i.e. those where two opposite sidewalls are connected by only one single connecting wall, and those where two opposite side walls are connected by two or more connecting walls. The profilated posts of the second group have, irrespective of the form of the slits, a hollow profile and according to the invention the shaft of the drawbolt may lie in this hollow of the profile. The parts of the clamping block which do not lie in the slits of the longitudinal post may also lie in the said hollow of the transverse support when the connection is in a clamped position.

If the transverse post has only one connecting wall, i.e. if two opposite walls are connected by one single wall only, it may often be necessary to bore a hole through part of this single wall or to break through this wall in another way in order to put the shaft of the drawbolt in its place within the transverse post, or to make room for this shaft in another way. According to the invention the bottom of a slit or of more than one slit may have along its entire length a canal, or the single connection wall may partially be bored through or broken through in longitudinal direction.

The cross section of this canal may advantageously either be circular or rectangular. It may also lie behind one or more of the bottoms of the said slits.

The hole in the single connecting wall or in a wall of the transverse support near the frontal end necessary for placing the drawbolt and/or the supporting block in its place has preferably its principal direction transversally to the longitudinal axis of the transverse support. That part of the wall of this hole, that is lying nearest to the frontal end surface of the transverse post may be either flat or curved. When it is curved it is preferably semicircular. When it is flat the cross section of the said hole may be rectangular.

The clamping block of the clamping device may have a hole provided with a screw thread or have similar parts serving as a screw hole, into which the drawbolt may be screwed. In this manner the axis of the screw hole may make any angle whatsoever with the flat sides of the clamping block that are intended to lie behind and against the flanges of the slit. According to the invention two opposite corners of the clamping block may be rounded off or slanted, so that the clamping block can be placed in a simple way from the side into a slit of the longitudinal support. In this case the clamping block is first placed with its longitudinal direction in the longitudinal direction of the slit of the longitudinal post and in this position it is placed into the slit. Thereupon it is turned over 90° until it is, with its longitudinal direction, transverse to the direction of the slit of the longitudinal post. Another way to bring a clamping block into a slit is either to push the clamping block at the end of the slit into the slit and then to move it in or along the said slit. Still another way is to remove the flanges of the slit at certain places over a certain length so that at these places the entering width of the slit is increased and the hooking parts of the clamping block may be placed into the slit at these places from aside and may be brought into their place by moving them in the slit along the post.

In case a supporting block is used in order to enable the head of the drawbolt to press on parts inside the transverse post, this supporting block according to the invention is provided with a hole through which the shaft of the drawbolt may be put.

In order to guarantee that the underside of the bolthead will lie satisfactorily flat against the supporting block, the supporting block according to the invention has a hole which is somewhat too wide for the shaft of the drawbolt and the said supporting block has been made so and is lying in such a way in the end part of the transverse support, that it is able to turn slightly around an axis perpendicular to the axis of the drawbolt in question, so that that side of the bolt head facing the screw end of the drawbolt may lie flatly against the corresponding flat side of the supporting block. The supporting block transfers, in this way, the pressure executed by the drawbolt to the frontal part or end surface of the transverse post. It is advantageous to make the shaft of the bolt with a circular cross section, whereby the inner diameter of the said circular hole in the supporting block is slightly bigger than the outer diameter of the shaft of the drawbolt. However, it is also possible to abstain from the use of a supporting block altogether and to have the flat side of the bolt head facing the frontal sidewall of the post lying directly upon flat parts of this transverse post and inside this post.

In case a supporting block is used, it is advantageously provided with curved wall parts for placing in the transverse post. The sidewall of the hole made near the frontal end of the transverse post that is used to bring in the drawbolt and supporting block may be curved also and be made semicircular, and the curved parts of the supporting block may lie hereon and be shaped correspondingly.

To this end the supporting block according to the invention may have two short circular axes, by which they may be placed in the walls of the transverse post. This construction may be used when the transverse post has a profile such that two opposite sidewalls are connected by more than one wall, so that, irrespective of the form of the slits used, this transverse post has a hollow profile.

The supporting block may also be crescent-shaped. This is advantageously used when two opposite sidewalls are connected by one single connecting wall only or by two parallel connecting walls. Hereby it may be advantageous to use the profile for the transverse post in which the bottom of a slit or of more than one slit has a canal along the full length of the profilated post in order to place the shaft of the drawbolt. If such a canal has not been provided for in the transverse post it may often be necessary to bore through that part of the single connecting wall which lies between the frontal surface of the transverse post and the hole near the head end of the transverse post, which is used to place the drawbolt and the supporting block. In certain cases the crescent-shaped supporting block is provided with protruding edges gripping around the connecting wall or walls of the transverse post, which edges make it easier to put these parts in their place. However, it is also possible to use a supporting block with flat sides. The sidewall of the hole lying near the frontal end of the transverse post may then be flat. Accordingly the supporting block may be rectangular. The cross section of the hole in the single connecting wall or in a wall of the transverse post may then also be rectangular. The supporting block then lies flatly against one sidewall of the hole.

Another form of the supporting block is possible if the single connecting wall of the transverse post is too thin to pierce or bore a hole through it for the shaft of the drawbolt. The supporting block then may have the shape of a cylinder bored through in longitudinal direction, in one end of which a saw-cut is made in longitudinal direction.

According to the invention it is advantageous if the bottom of the saw-cut is a curved plane. According to the invention the head end of the transverse post is accordingly made, in that the hole in the single connecting wall of this transverse post for the purpose of placing the drawbolt and the supporting block, now passes into a narrower part till the frontal end of the transverse post, whereby shoulders are formed between the narrower and the wider part in such a way, that these shoulders may be put into the abovementioned saw-cut of the supporting block. It is advantageous to shape these shoulders so that they form a curved plane, so that the supporting block may slightly turn around an axis perpendicular to the axis of its drawbolt, respectively perpendicular to its bore.

A further feature and advantage of the connection of posts according to the invention is that the clamping device according to the invention is shaped such that the head of the drawbolt may be screwed on from a place at the side of the transverse support. This is the reason why the connection is made such that, although the parts belonging to the clamping device are, for the greater part hidden from view, the head of the screw bolt may still be reached through the hole in the single connecting wall or the hole in another wall of the transverse support which hole near the head end of the post serves at the same time to place the clamping bolt or the clamping bolt with supporting block mounted thereon in position in the head end of the transverse post. According to the invention the head of the drawbolt has preferably a hexagonal hole, the axis of which has generally the same direction as the axis of the head and the shaft of the drawbolt, and therefore, of the drawbolt itself. When using a screwdriver of a special shape it will then be possible to screw on the bolthead and consequently the drawbolt also, when the straight axis of the bolt and the straight axis of the screwdriver make an obtuse angle with each other, i.e. when this angle lies between 90° and 180°.

This means that with the abovementioned specially shaped screwdriver the head of the drawbolt may be screwed on from a place at the side of the transverse support. This specially shaped screwdriver is subject of another invention and patent application Serial No. 674,912, filed July 29, 1957, now abandoned, by the same inventor and this hexagonal screwdriver has to this purpose a straight axis and has been provided at its end with a hexagonal ball-end.

The connection and the clamping devices used in it according to the invention have an extraordinarily wide field of application, as they may be used in the construction of all kinds of frameworks and constructions like: bridges, roofs and roof girders, cranes, elevators and other transport devices, furniture, scaffolds, switchboards, platforms and balconies and all sorts of structures for apparatuses and machines, in a word, everywhere, where profilated iron or profilated metal is used.

The connection of profilated posts and the clamping device according to the invention will be described by way of example with the aid of the drawings, these drawings, however, showing only a few embodiments of the invention. In these drawings:

FIG. 1 shows a connection of two similar profilated posts, whereby the longitudinal post has been drawn in cross section and the transverse post in plan view, and whereby two opposite walls of a post are connected by two other walls in such a way, that the post is hollow, and furthermore two walls of a post have dovetail-shaped slits and the clamping block hooks with dovetail-shaped parts into the said slits, and those parts of the clamping block that are not inside the principal outer profile of the longitudinal post are lying within the hollow of the transverse post or its supposed prolongation and the drawbolt also lies in this hollow and is pressing by means of a supporting block on inside parts of the frontal end of the transverse post, the said supporting block being provided to this end with two short circular axes;

Figures 1, 2, 3, 4:
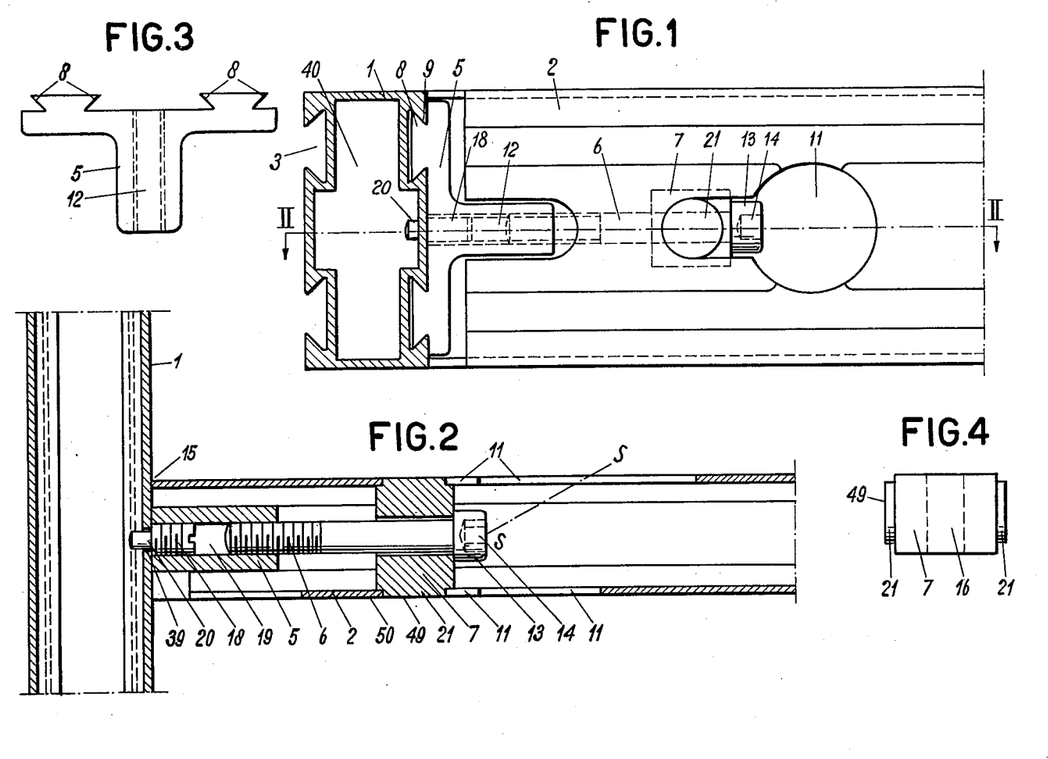
FIG. 2 shows a cross section along the line II—II of the connection according to FIG. 1.
FIG. 3 is a view of the clamping block, that may be used for the connection according to FIGS. 1 and 2.
FIG. 4 shows the supporting block, belonging to the connection according to FIGS. 1 and 2.

In FIG. 1, 1 is the longitudinal post, 2 the transverse post, 3 are the slits or chambers having flanges or edges 9 opposing each other in such a way that the slit is less wide between these flanges than at a place deeper in the slit. The posts used have a hollow profile and the hollow or channel is indicated by 40. The clamping device possesses a clamping block 5, a drawbolt 6 and in this embodiment also a supporting block 7. Furthermore also a center bolt 18 has been used in this embodiment, having a center end 20. There are, however, also embodiments of the connection according to the invention in which either no supporting block or no center bolt or none of both are used. The supporting block 7 (FIG. 4) has two short axes 21, with which it is placed in the sidewalls of the transverse post. Furthermore it has a hole 16 through which the shaft of the drawbolt may be put, whereby preferably the inner diameter of the hole is slightly larger than the outer diameter of the shaft, so that there is some play between both parts. The drawbolt 6 is provided with a screw thread and may be screwed into the hole 12 of the clamping block 5, said hole being also provided with a screw thread. The clamping block 5 (FIG. 3) has dovetailed parts wich may be put into the slits 3, so that the parts 8 may catch or hook behind the flanges 9. The slits 3 are correspondingly dovetailed.

Figure 5:
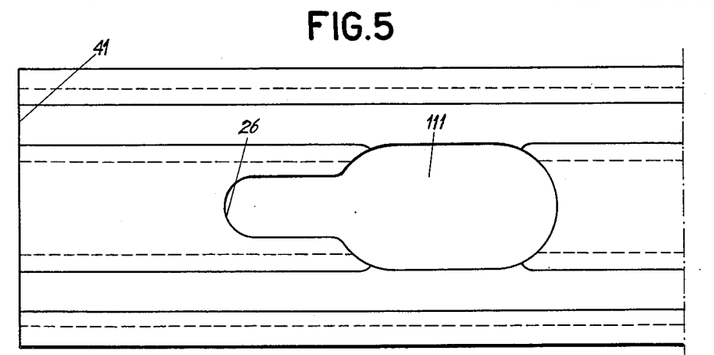
FIGS. 5 and 6 show forms of holes which may be made in the wall of the transverse post near the endpart.
Figure 6:
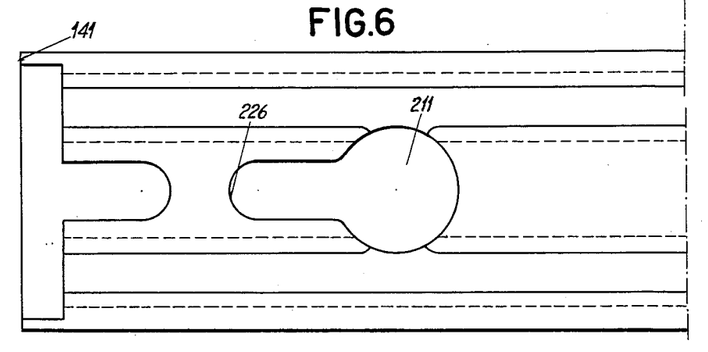
Figure 7:
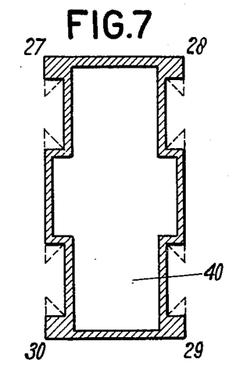
FIG. 7 show which parts of the flanges may be removed over a certain length in order to be able to place the clamping block from aside into the slit.
Figure 8:
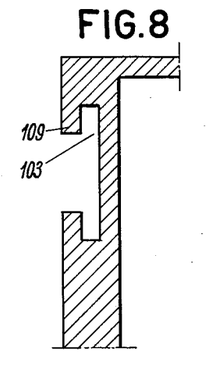
FIGS. 8 and 9 show other embodiments of slits having also edges or flanges opposing each other in such a way, that the slit is less wide between the edges than at a place deeper in the slit.
Figure 9:
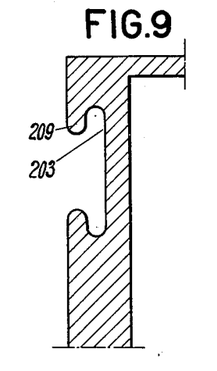

In the transverse post, holes 11 have been made in the connecting walls near the end part. FIGS. 5 and 6 show further embodiments of these holes (111, 211), whilst FIGS. 8 and 9 show further embodiments of the slits 103 and 203, having also flanges 109 and 209. The wall of the holes 11, 111, 211 is curved on the side of the frontal end of the post and preferably made semicircular (26). The supporting block is placed into the transverse post, whereby it lies with its axes 21 upon the walls 26. It is also possible to put first the drawbolt with its shaft through the supporting block and thereupon to place both together in the transverse post in the position as shown in FIGS. 1 and 2. According to the invention the dimensions of the drawbolt and the supporting block have been chosen such that these parts do not protrude out of the principal outer profile of the transverse post or its supposed prolongation, so that the angles 15, FIG. 2, which are formed by the longitudinal and the transverse post, are entirely free. The clamping block is placed with its parts 8 into the slit of the longitudinal post and put in its place. If a center bolt is used, the right place of the clamping block may be secured by said center bolt 18 which is screwed into the same screw hole 12 and is placed with its center end into a center hole 39. This center hole is bored into the longitudinal post at the wanted place. However, the use of a center bolt and a center hole may be abstained from in order not to damage the longitudinal post. The connection of the two posts is now effected as follows. On the one hand the draw bolt and the supporting block are placed in the transverse post. On the other hand the clamping block with its dovetailed parts is put into the slits of the longitudinal post and moved therein till it has reached its proper place. Now the transverse post is put transversly to the longitudinal post, the drawbolt is screwed with its shaft into the screw hole of the clamping block and is screwed on so tightly that the frontal end (41, 141) of the transverse post is tightly pressed against the side wall of the longitudinal post as shown in the FIGS. 1 and 2.

In a clamped position the head of the drawbolt presses with its side that is turned towards the longitudinal post on the supporting block and the latter presses with its axes 21 on the surfaces 26 of the transverse post, so that the transverse post is tightly pressed with its frontal end 41 (FIG. 5) or 141 (FIG. 6) on the side wall of the longitudinal post. In fact the supporting block transfers the pressure of the head of the drawbolt onto the transverse post, without any part of the said supporting block or of the drawbolt protruding outside the principal outer profile of the transverse post, so that the angles 15 remain entirely free. In FIGS. 1 and 2 the supporting block does, moreover, not protrude outside the outer dimensions of the transverse post, because the end surfaces 49 of the axes 21 lie even with the outer wall 50 of the transverse post. The supporting block is subjected to pressure, and in this embodiment also to bending. The parts of the clamping block 5 outside the slit 3 are lying in the hollow 40 of the transverse post. The drawbolt also lies in this hollow of the transverse post or in its supposed prolongation. In order not to have to move the clamping block entirely from the utmost end of the longitudinal post to its place the flanges 9 may be removed over a certain length, as shown in FIG. 7 with 31 in dotted lines. By doing so the clamping block with its parts 8 may be brought into the slit of the post from the side and the parts 8 need not to be moved in from the utmost end of the slit.

According to the invention the head of the drawbolt may be provided with a hexagonal hole 14. With a special tool, for example, with a special screwdriver with a hexagonal ball end (according to the aforementioned patent application of the same inventor) the drawbolt may now be screwed on from a place at the side of the transverse post, whereby the hole 11 provides an entrance to the bolthead.

The straight axis of the screwdriver may have the position S—S, FIG. 2, so that the straight axis of the drawbolt and the straight axis of the screwdriver form an obtuse angle. As the supporting block may turn slightly with its axes 21 around an axis perpendicular to the axis of the drawbolt and this movement is made possible because the hole 16 is slightly wider than the shaft of the bolt, the head of the drawbolt lies with its lower surface flatly upon a flat side of the supporting block. The clamping block, which is slidable with its dovetail parts in the slits of the longitudinal posts, is in fact a movable screw hole 12 at the longitudinal post and with this movable screw hole a transverse post can be clamped at any place on the side wall of the longitudinal post, without this wall being damaged or altered provided that the use of a center bolt is abstained from. Thereby the clamping device according to the invention has the advantage that it does not protrude anywhere outside the principal outer profile of the posts in question or their supposed prolongation, and that it may be screwed on or loosened from a place near the sidewall of the post, whereby the same hole that is used to put in the drawbolt, is also used to screw on this bolt, and to screw it loose. In this embodiment the principal outer profile of the posts according to FIGS. 1 and 2 is rectangular, and indicated by 27, 28, 29 and 30 in FIG. 7. By the principal outer profile is meant the outer profile when the slits 3 are supposed to be filled up.

Figure 10:
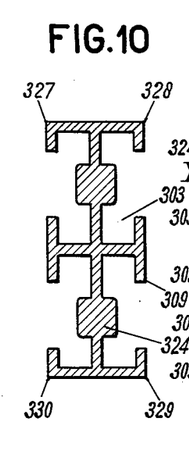
FIG. 10 shows a profilated post in which two opposite walls of the post are connected by only one single wall and which has also slits with edges facing and nearing each other, and whereby the single connecting wall has reinforcements.
Figure 11:
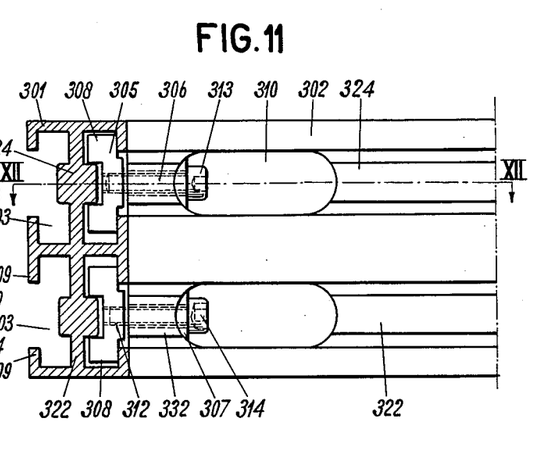
FIG. 11 shows a further embodiment of the connection according to the invention in which two similar posts according to FIG. 10 are used, whereby two clamping devices, each provided with a drawbolt and a clamping block have been used, and the clamping block lies fully in the slit of the longitudinal post and the supporting blocks used are crescent-shaped.

FIGS. 10 and 11 show the form of another profile which may be used for the posts. Here the principal outer profile is also rectangular, indicated by 327, 328, 329 and 330. The profile has here a single connecting wall 322 having reinforcements 324. The slits 303 have flanges 309. The reinforcements 324 are used by boring a hole therein, as far as necessary, in which hole the shaft of the drawbolt may be put. This hole has generally the same direction as the transverse post itself.

Figure 12:
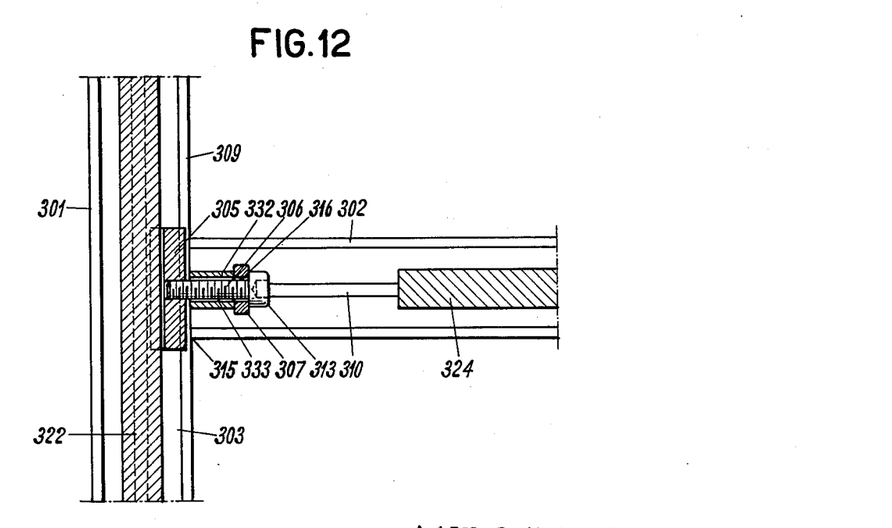
FIG. 12 shows a cross section along the line XII—XII of FIG. 11.
Figures 16, 17, 18, 19:
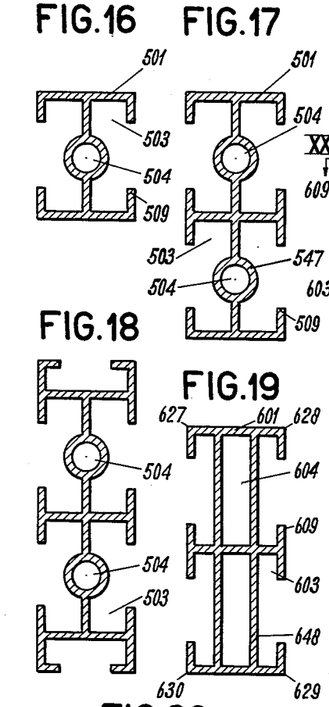
FIGS. 16, 17 and 18 show profiles of profilated posts, whereby the bottom of a slit has a canal along the full length of the post, said canal having a circular cross section.
FIG. 19 shows the profile of a post whereby the said canal is rectangular and lying behind the bottom of a slit.

FIG. 17 shows such a profile with a hole or channel (504) of the same sort and for the same purpose in the reinforcements. FIGS. 11 and 12 show a connection of two profilated posts according to FIG. 10. In these figures 301 is the longitudinal post, 302 the transverse post, 303 the slit, 305 the clamping block which is rectangular of form and lies here entirely in the respective slit and does not protrude outside the principal outer profile of the longitudinal post, 306 is the drawbolt, 307 the supporting block which is here crescent-shaped, 308 are these parts of the clamping block which catch or hook behind the flanges 309 of the slits, 310 is the hole made in the single connecting wall of the transverse post and which serves to put the drawbolt and the supporting block in its place and to screw on the drawbolt from the side of the transverse post, 312 is the hole in the clamping block provided with screw thread, 313 is the head of the draw bolt with a hexagonal hole 314, 316 is the hole in the supporting block through which the drawbolt is put and which is preferably slightly wider than the diameter of the shaft of the drawbolt, so that it may "find" its position when the drawbolt is screwed on. Furthermore 322 is the single connecting wall of the profile, 333 is a hole or channel which is bored into this connecting wall between the frontal end 341 and the hole 310 in order to be able to place the shaft of the drawbolt, 324 are the reinforcements in the connecting wall, because the connecting wall 322 itself is too thin to have the hole 333 bored in it.

When the drawbolt is screwed on, the transverse post is clamped with its frontal end 341 upon the side wall of the longitudinal post. The clamping block and the shaft of the drawbolt are completely hidden from view so that the angles 315 are free. The hole in the crescent-shaped supporting block is again slightly bigger than the diameter of the shaft of the drawbolt, so that the supporting block may be able to move slightly around an axis perpendicular to the axis of the drawbolt, and the head of the drawbolt may lie flatly against the flat side of the crescent-shaped supporting block. The head of the drawbolt is again provided with a hexagonal hole 314.

Figure 13:
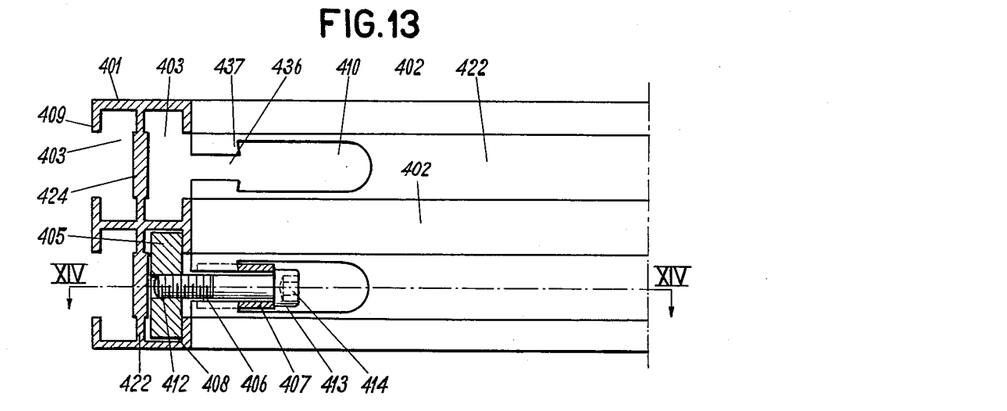
FIG. 13 shows a connection of profilated posts similar to FIG. 10, whereby the reinforcement of the single connecting wall is only slight and may be omitted altogether, and the supporting block has the shape of a cylinder bored through in longitudinal direction, and each hole in the single connecting wall near the end part of the transverse post changes into a narrower part near the frontal end and has shoulders between the wider and the narrower part.
Figure 14:
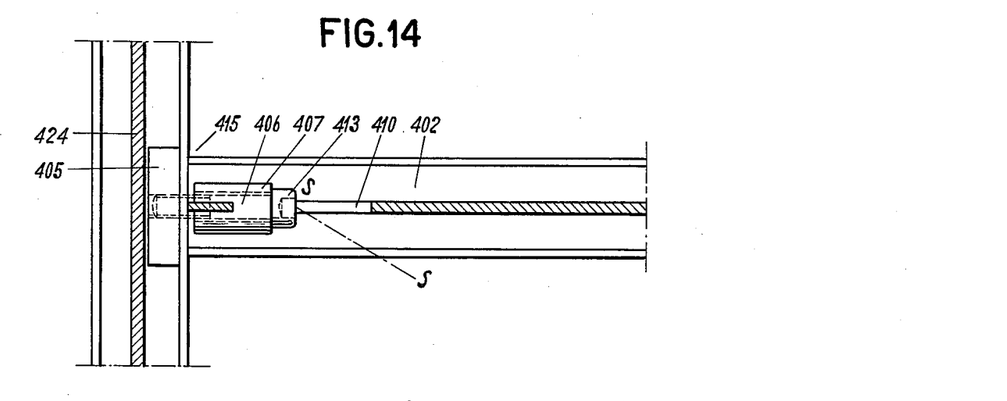
FIG. 14 shows a cross section along the line XIV—XIV of FIG. 13.
Figure 15A:
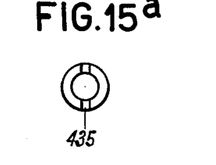
FIGS. 15a, b and c show the cylindrical supporting block.

The FIGURES 13, 14 and 15a, b, c, show an embodiment of the connection which is used when the connecting wall 422 of the profile is not or only slightly thickened at 424.

Figure 15B:
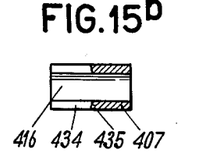
Figure 15C:
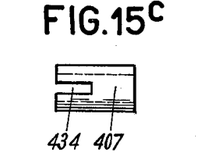

Advantageously a cylindrically shaped supporting block 407 is now used that may be bored through and has been provided with a saw cut 434. The hole 410 in the single connecting wall serving for putting in and screwing on the drawbolt now passes on to the frontal surface of the transverse post by a narrower part or channel 436, thereby forming shoulders 437. These shoulders form a bent surface or are somewhat bent towards each other so that the supporting block may move slightly around an axis prependicular to the axis of the drawbolt. The saw cut in the supporting block is slightly wider than the thickness of the shoulders, respectively the thickness of the parts 424, so that the shoulders may be put into the saw cut. The clamping block 405 is here of a rectangular shape and therefore very simple. It lies entirely in the slit 403. The parts 408 of the clamping block catch or hook behind the flanges 409, when the clamping connection is screwed on. Here too the parts of the clamping connection are, in a clamped position, entirely inside the principal outer profiles of the posts as shown in FIG. 14. The angles 415 are again entirely free. The holes 410 and 436 may now be punched out, if the connecting wall is sufficiently thin, FIGURES 15a, 15b, 15c show the cylindrical supporting block with saw cut 434 and 416 is the boring. The saw cut bottom 435 is preferably bent.

FIGURES 16, 17, 18, 19 and 20 show profiles of profilated posts which have a similarity to the profile according to FIG. 10. In FIGS. 16, 17, 18, however, a canal or channel 504 is shown, which lies in the bottom wall of the slit 503 and serves to provide the possibility of putting in the shaft of the drawbolt at any desired place. It corresponds, therefore, to the hole 333 of FIG. 12. The difference is, however, that the canal 504 exists from the beginning over the full length of the post, whereas the hole 333 has to be bored afterwards.

Figure 20:
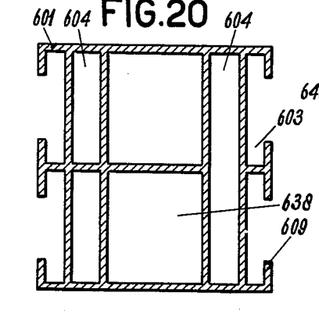
FIG. 20 shows a profile according to FIG. 19, whereby beside slits and canals, also other hollows are present.

The canal 504 has in the shown profiles a circular cross section. In the FIGURES 19, 20, 21 and 22 there is a corresponding canal or channel 604 in the profile, which serves the same purpose as the circular canal 504. The canal 604, however, lies behind the bottom of the slit 603, or behind more than one slit as shown in FIG. 20. In the clamped position of the connection the shaft of the drawbolt 606 lies also in this canal 604. As FIG. 20 shows the post may have the following hollow parts: the slits 603, the canals 604 and further holes 639.

Figure 21:
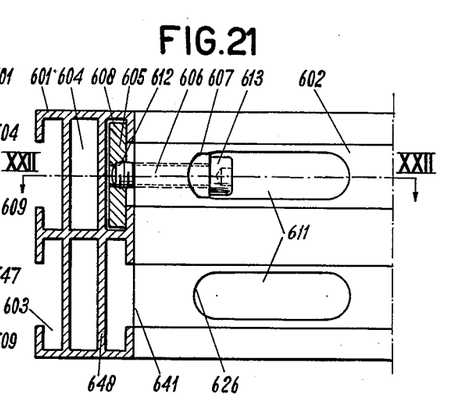
FIG. 21 shows a preferred embodiment of a connection of profilated posts according to FIG. 19, having two clamping devices, each provided with a drawbolt and a clamping block, whereby each clamping block lies fully in its slit and is rectangular, and each supporting block is crescent-shaped and provided with protruding edges; furthermore it is shown that the head of the drawbolt has a hexagonal hole, whereby the direction of the axis of said hole is the same as the direction of the axis of the straight drawbolt itself; furthermore it appears clearly that the drawbolt may be screwed on from a place at the side of the transverse post.
Figure 22:
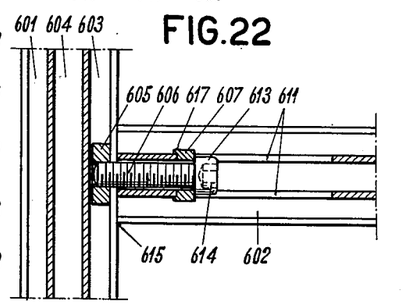
FIG. 22 shows a cross section along the line XXII—XXII of the connection according to FIG. 21.

FIGURES 21 and 22 show an embodiment of the connection according to the invention, using profilated posts similar to FIG. 19. This embodiment has many advantages and is preferred. Herein 601 is the longitudinal post, 602 the transverse post, 604 the canal or channel for housing the shaft of the drawbolt, 605 the clamping block, which has here again the simple rectangular shape and lies entirely in the slit 603, 612 is the screw hole in the clamping block, 606 is the drawbolt with a shaft provided with a screw thread, 607 is the supporting block which has again a crescent-like shape, but is here provided with protruding edges 617 which are gripping around the walls of the posts to obtain the advantage of facilitating the placing of the supporting block and giving a better "sit" to it. A comparison of the profiles according to FIGS. 17 and 19 shows the following. With a post with a profile according to FIG. 17 the use of a supporting block is not necessary, as the lower part of the head of the drawbolt has a sufficiently big surface for lying on the circular surface 547, FIG. 17, which surface lies round the canal 504. With a post with profile according to FIG. 19, however, the lower part of head of the drawbolt lies upon the parallel surfaces 648 and is therefore not supported all around. The supporting block now forms a bridge from the one surface 648 to the other across the canal 604. The shown supporting block 607, FIG. 22, has edges 617 gripping around the connecting wall 648.

Nothwithstanding that, the supporting block still lies within the principal outer profile dimensions, so that the angles 615 remain free. It is also possible to have the edges of the supporting block nearer to each other and lying against the inner wall of both connecting walls 648, so that the supporting block may be made somewhat shorter and remains within the outer profile dimensions. The length of the supporting block need then not be longer than the distance between the outer walls of the connecting walls 648 and, therefore, not longer than the width of the canal 604 plus the thickness of both connecting walls 648. In this case all parts belonging to the clamping device lie within the outer post dimensions of the used clamped profiles.

In FIGS. 21 and 22 is 613 the bolt head with hexagonal hole 614, 611 are the holes in the walls for purpose of placing and screwing on the drawbolt, whereby the part of the wall 626 of these holes are curved and preferably have the form of a half circle at the side nearest to the frontal surface 641, so that the supporting block may turn slightly around an axis perpendicular to the bolt axis. To this purpose the hole in the supporting block is again somewhat bigger than the diameter of the shaft of the drawbolt, so that there is some play. In a clamped position the clamping block and the shaft of the drawbolt are completely hidden from view. The angles 615 are entirely free. All parts of the clamping connection lie within the principal outer profile of both posts. The connection may easily be screwed on and as easily be disconnected. The connection is not injured by the screwing on or screwing off. The connection may be moved or reset over any distance, as the posts are nowhere damaged or impaired by the clamping. The principal outer profile is rectangular 627, 628, 629, 630, FIG. 19. The head of the drawbolt has a hexagonal hole 614, the axis of which has the same direction as the axis of the drawbolt. The straight axis of the screwdriver may have the position S—S, according to FIG. 2, so that the straight axis of the drawbolt and the straight axis of the screwdriver form an obtuse angle.

The connection has two clamping devices according to the invention, each provided with a clamping block, a drawbolt and a supporting block.

Figure 23:
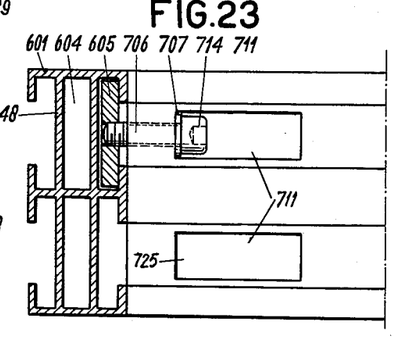
FIG. 23 shows another preferred embodiment of the connection according to FIG. 21, whereby, however, the supporting block is rectangular and flat, and the holes in the walls near the end part of the transverse post for purposes of putting in and screwing on the drawbolt are rectangular.

FIG. 23 shows a connection corresponding to the connection of FIGS. 21 and 22. The difference is that the hole 711 is now rectangular, i.e. the wall 725 of the hole 711 nearest to the frontal surface of the transverse post is now flat, and the supporting block 707 is also flat and has here a rectangular shape. If this supporting block has no edges corresponding to edges 617 of FIG. 22 or these edges are lying adjacent to the inside surface of the walls 748 and are, therefore, lying in the canal 604, it needs not to grip around or protrude outside the outer walls of the transverse post, and all parts of the clamping connection may be in clamped position inside the outer dimensions of the profilated posts.

Figure 24:
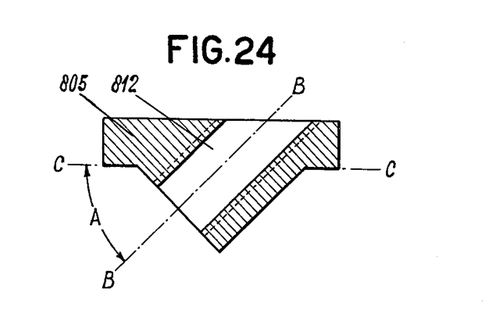
FIG. 24 shows a cross section of a special clamping block, whereby the axis B—B of the hole provided with a screw thread makes an angle A of 45° with the plane C—C of those surfaces of the clamping block, which are intended to press against the inside parts of the flanges of the longitudinal post.
Figure 28:
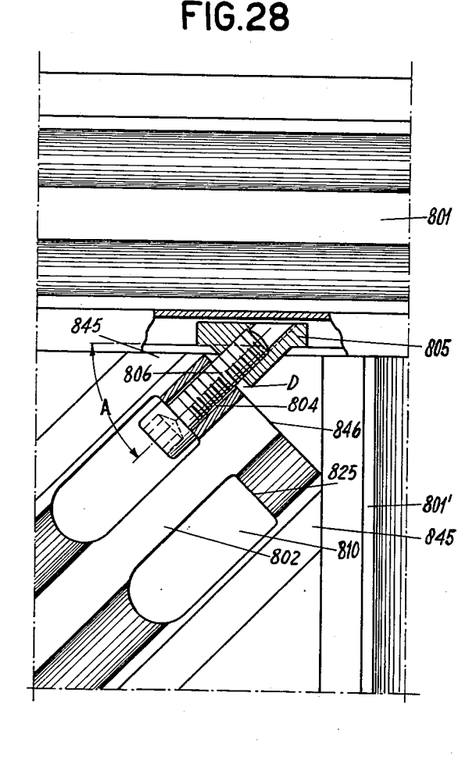
FIG. 28 is a view and part cross section of a connection, whereby clamping blocks according to FIG. 24 are used and whereby a profilated post used as transverse post, is clamped with surface parts of its end part on the side walls of two longitudinal posts, thereby forming an angle A of 45°.

FIG. 24 shows a cross section through a clamping block, whereby the axis B—B of its screw hole may make any angle A with the surfaces C—C, which are intended to lie against the inner side of the flanges 109, 609, 909 of the post-slits. The angle A is here 45°, but any other angle may be chosen. With this clamping block (see FIG. 28) a post 802 may be clamped serving as transverse post to another post 801, 801' under any given angle A, as is shown in FIG. 28. In FIG. 28 posts 801 have been used with a profile according to FIG. 18. One of the posts 801' may be regarded as a transverse post rectangular to the other post 801 as a longitudinal post. Both posts 801 and 801' may be regarded as longitudinal posts for a third post 802, which has been clamped with its frontal end surface upon both these posts. The post 802 may be considered here as a diagonal post of a frame construction and the frontal end has, to this end, two slanted surface parts 845 under an angle of 45° with the longitudinal direction of the post 802.

The hole 810 has been made here on one side with a flat wall part 825 and on the other side with a semi-circular wall part. The bolt head presses without a supporting block against the flat circular wall 825, as also described in FIG. 18, according to 547. The connection has two clamping devices each possessing a drawbolt 806 and a clamping block 805. One of these has only been drawn. In this example the angle A is 45°. As the canal or channel 804 is an integral part of the post 802, only the holes 810 or similar holes in the head end of the post 802 need be made, to be able to put the screwbolt in its place.

The edged-off end surfaces 845 of the head of the transverse post 802 are pressed upon the side wall of the longitudinal posts 801 and 801' respectively. Between the frontal surface 846 and the clamping block and also between the frontal surface 846 and the side walls of the longitudinal post there is, however, free room D left. In this embodiment the parts of the clamping connection therefor lie not entirely within the outer dimensions of the posts that are clamped together, but they do lie within their principal outer profiles and their supposed prolongations.

Figure 25:
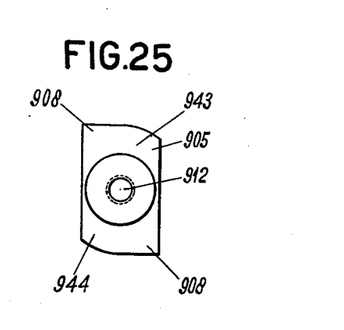
FIG. 25 is a top view of a clamping block according to FIG. 24, in which, however, the angle A is 90°, and whereby two opposite corners of the clamping block have been rounded off.
Figure 26:
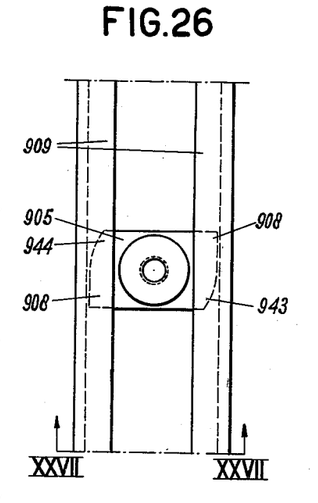
FIGS. 26 and 27 show how the clamping block according to FIG. 25 will lie in a slit of a post.
Figure 27:
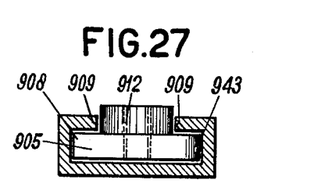

FIG. 25 shows a clamping block with two opposite corners 943 and 944 having been rounded off or edged off. FIG. 26 shows how this clamping block can be made to lie in a slit of a post. The roundings serve to simplify the placing in of the clamping block into a slit from the side of a post, i.e. the clamping block need now not to be put in from one end of the post into the slit and shoved on. The removal of parts 31, 531 of the flanges as shown in dotted lines in FIG. 7 is also avoided. In order to put a clamping block with rounded-off corners at 905 from a place aside of the post into the slit, it is first placed with its longitudinal direction in the longitudinal direction of the slit and in this position it is brought into the slit. Thereupon it is turned over 90° around its own axis and here, according to FIGS. 25, and 26, turned to the right, so that the parts 908 come to lie behind the flanges 909, as shown in FIGS. 26 and 27. The rounded-off corners 943 and 944, therefore, do not obstruct the turning of the block.

The rounding off or edging off of opposite corners of a clamping block is also possible with other embodiments of the clamping block, such as e.g. with the clamping block 605, FIG. 21 or 405, FIG. 13. The clamping of a transverse post or a diagonal post under any given angle to another post, as shown in FIG. 28, may also be done in other embodiments of the connection, as e.g. with connections according to FIG. 22 or 23. Slanted or edged-off corners similar to 845 must then be provided for. The screw hole 12 is then also made under some angle A in the rectangular clamping block, or a clamping block according to FIG. 24 may be used.

It is thus evident in each of the illustrated embodiments that each transverse post has a channel (such as 40, 333, 436, 504 and 604) in communication with the end surface of the tranverse post and the transverse opening through said post, the intersection of said channel and said opening defining a shoulder such as shoulder 437 or 825. The draw bolt lies in the channel with the head of the bolt in the transverse opening, the head of the bolt applying pressure to the shoulder, either directly or through the intermediate supporting block to maintain the posts in secure engagement.

It is also obvious that the connecting wall in the transverse posts may be an interior wall such as 648 in FIG. 19 or an exterior wall as shown in FIG. 1.

What I claim is:

1. A connection comprising a first post having a longitudinally extending side wall including two spaced opposed longitudinal flanges defining a longitudinal slit therebetween, a second post having an end surface, at least a part of said end surface abutting said side wall of said first post, clamping means securing said posts in abutting engagement, said clamping means including a clamping block and a draw bolt in threaded engagement therewith, at least a portion of said block being in said slit and seated behind said flanges, said second post having two spaced apart walls and a connecting wall, said connecting wall having a transverse opening therein near said end surface, said second post having a longitudinal channel in communication with said end surface and said transverse opening, the intersection of said channel and said opening defining a shoulder, said draw bolt being positioned in said channel with the head of said bolt in said opening, the head of said bolt applying pressure to said shoulder to maintain said posts in secure engagement, the head of said bolt being accessible through said connecting wall for adjusting the threaded engagement, said first post and second post having the same cross-sectional shape.

2. A connection as recited in claim 1 wherein the clamping means lies entirely within the surfaces defining the principal outer profiles of the posts.

3. A connection as recited in claim 1 wherein a supporting block is interposed between the head of the bolt and said shoulder.

4. A connection as recited in claim 1 wherein said longitudinal slit has a dovetail cross section and said clamping block has a dovetail cross section interengaging with the dovetail cross section of said slit.

5. A connection as recited in claim 1 wherein said second post has two opposed connecting walls, said walls being exterior walls and defining between them said channel.

6. A connection as recited in claim 1 wherein said channel runs through said connecting wall.

7. A connection as recited in claim 6 wherein said shoulder is defined by a plane perpendicular to the longitudinal axis of said second post and said channel is circular.

8. A connection as recited in claim 6 wherein said shoulder is arcuate and there is provided a supporting block having an arcuate surface abutting said arcuate shoulder, the head of the bolt abutting said supporting block.

9. A connection as recited in claim 6 wherein said channel extends laterally from one face of said wall to the other face thereof.

10. A connection comprising a first post having a longitudinally extending side wall including two spaced opposed longitudinal flanges defining a longitudinal slit therebetween, a second post having an end surface, at least a part of said end surface abutting said side wall of said first post, clamping means securing said posts in abutting engagement, said clamping means including a clamping block and a draw bolt in threaded engagement therewith, at least a portion of said block being in said slit and seated behind said flanges, said second post including at least one pair of opposed connecting walls defining therebetween at least one longitudinal channel extending throughout the length of said second post, each wall of said pair of walls having a transverse opening therethrough near said end surface, said channel communicating with said end surface and said transverse openings, the intersection of said channel and said openings defining shoulders, said draw bolt being positioned in said channel with the head of said bolt being above said shoulders, the head of said bolt applying pressure to said shoulders to maintain said posts in secure engagement, the head of said bolt being accessible through said connecting walls for adjusting the threaded engagement.

11. A connection as recited in claim 10 wherein both posts have the same cross sectional shape.

12. A connection as recited in claim 10 wherein the clamping means lies entirely within the surfaces defining the principal outer profiles of the posts.

13. A connection as recited in claim 10 wherein said shoulders lie in a plane transverse to the longitudinal axis of said second post.

14. A connection as recited in claim 10 wherein a supporting block is interposed between said shoulders and the head of said bolt.

15. A connection as recited in claim 10 wherein said shoulder is arcuate and there is provided a supporting block having an arcuate surface abutting said arcuate shoulder, the head of the bolt abutting said supporting block.

16. A connection as recited in claim 10 wherein said shoulders lie in a plane transverse to the longitudinal axis of said second post and there is provided a supporting block interposed between said shoulders and the head of said bolt.

17. A connection comprising a first post having a longitudinally extending side wall including two spaced opposed longitudinal flanges defining a longitudinal slit therebetween, a second post having an end surface, at least a part of said end surface abutting said side wall of said first post, clamping means securing said posts in abutting engagement, said clamping means including a clamping block and a draw bolt in threaded engagement therewith, at least a portion of said block being in said slit and seated behind said flanges, said second post including at least one pair of opposed connecting walls defining therebetween at least one longitudinal channel extending throughout the length of said second post, each wall of said pair of walls having a transverse opening therethrough near said end surface, said channel communicating with said end surface and said transverse openings, the intersection of said channel and said openings defining shoulders, said draw bolt being positioned in said channel with the head of said bolt being above said shoulders, the head of said bolt applying pressure to said shoulders to maintain said posts in secure engagement, said clamping means lying entirely within the surfaces defining the principal outer profiles of said posts, the head of said bolt being accessible through the connecting walls of said second post for adjusting the threaded engagement, said posts having the same cross sectional shape.

18. A connection as recited in claim 1 wherein said posts are at an angle of less than 90 degrees with respect to each other.

19. A connection as recited in claim 1 wherein there is provided a third post, the end surface of said second post abutting said third post.

20. A connection as recited in claim 1 wherein said connecting wall defines at least part of the wall of said channel.

21. A connection comprising a first post and a second post each having the same cross sectional shape, each post having two outer side walls, each wall including two parallel pairs of spaced opposed longitudinal flanges, each pair of flanges defining a longitudinal slit therebetween, at least a part of an end surface of the second of said posts abutting one of said side walls of said first post, each of said posts having at least one pair of opposed connecting walls parallel to and between said side walls, said connecting walls defining therebetween at least one channel, each wall of said pair of connecting walls on said second post having a transverse opening therethrough near said end surface, the channel of said second post communicating with said end surface and said transverse openings, the intersection of said channel and said openings defining shoulders, clamping means securing said posts in abutting engagement, said clamping means including a clamping block and a draw bolt in threaded engagement therewith, at least a portion of said block being in one of said slits of said first post and seated behind the pair of flanges defining said slit, said draw bolt being positioned in the channel of said second post with the head of the bolt being above said shoulders, and a supporting block interposed between said shoulders and the head of said bolt, the head of said bolt applying pressure to said shoulders through said supporting block to maintain said posts in secure engagement, said openings being in line with opposed slits on the side walls of said second post, said openings being elongated in the direction of the length of said second post, said clamping means lying entirely within the surfaces defining the principal outer profiles of said posts, the head of said bolt being accessible through the slits of said second post for adjusting the threaded engagement, said channels extending throughout the length of said posts.

22. The connection as recited in claim 1 wherein the head of the draw bolt has an axial, hexagonal recess for reception of a total for rotating said bolt.

23. The connection as recited in claim 10 wherein the head of the draw bolt has an axial, hexagonal recess for reception of a total for rotating said bolt.

24. The connection as recited in claim 21 wherein the head of the draw bolt has an axial, hexagonal recess for reception of a tool for rotating said bolt.

25. A connection comprising a first post having a longitudinally extending side wall including two spaced opposed longitudinal flanges defining a longitudinal slit therebetween, a second post having an end surface, at least a part of said end surface abutting said side wall of said first post, clamping means securing said posts in abutting engagement, said clamping means including a clamping block and a draw bolt in threaded engagement therewith, at least a portion of said block being in said slit and seated behind said flanges, said second post having a side wall and a connecting wall, said side wall including two spaced opposed longitudinal flanges defining a longitudinal slit therebetween, said connecting wall having a transverse opening therein near said end surface, said second post having a channel in communication with said end surface and said transverse opening, the intersection of said channel and said opening defining a shoulder, said draw bolt being positioned in said channel with the head of said bolt in said opening, the head of said bolt applying pressure to said shoulder to maintain said post in secure engagement, the head of said bolt being accessible through said connecting wall and said slit of said second post for adjusting the threaded engagement.

26. A connection comprising a first post having a longitudinally extending side wall including at least two pairs of spaced opposed longitudinal flanges, each pair defining a longitudinal slit therebetween, said slits being accessible from the same side of said first post, a second post having an end surface, at least a part of said end surface abutting said side wall of said first post, clamping means securing said posts in abutting engagement, said clamping means including at least one clamping block and at least one draw bolt in threaded engagement therewith, at least a portion of a block being in each slit and seated behind said flanges, said second post including at least one pair of opposed connecting walls defining therebetween at least one longitudinal channel, each wall of said pair of walls having a transverse opening therethrough near said end surface, said channel communicating with said end surface and said transverse openings, the intersection of said channel and said openings defining shoulders, said draw bolt being positioned in said channel with the head of said bolt being above said shoulders, the head of said bolt applying pressure to said shoulders to maintain said posts in secure engagement, the head of said bolt being accessible through said connecting walls for adjusting the threaded engagement.

27. A connection comprising a first post having a longitudinally extending side wall including two spaced opposed longitudinal flanges defining a longitudinal slit therebetween, a second post having an end surface, at least a part of said end surface abutting said side wall of said first post, clamping means securing said posts in abutting engagement, said clamping means including a clamping block and a draw bolt in threaded engagement therewith, at least a portion of said block being in said slit and seated behind said flanges, said second post having two spaced apart walls and a connecting wall, said connecting wall having a transverse opening therein near said end surface, said second post having a longitudinal channel in communication with said end surface and said transverse opening, said channel extending throughout the length of said second post, the intersection of said channel and said opening defining a shoulder, said draw bolt being positioned in said channel with the head of said bolt in said opening, the head of said bolt applying pressure to said shoulder to maintain said posts in secure engagement, the head of said bolt being accessible thorugh said connecting wall for adjusting the threaded engagement.

28. A connection comprising a first post having a longitudinally extending side wall including at least two pairs of spaced opposed longitudinal flanges, each pair defining a longitudinal slit therebetween, a second post having an end surface, at least a part of said end surface abutting said side wall of said first post, clamping means securing said posts in abutting engagement, said clamping means including at least one clamping block and at least one draw bolt in threaded engagement therewith, at least a portion of a block being in each slit and seated behind said flanges, said second post having a side wall and a connecting wall, said side wall of said second post including at least two pairs of spaced opposed longitudinal flanges, each pair defining a longitudinal slit therebetween, the slits of each post facing each other, said connecting wall having a transverse opening therein near said end surface, said second post having a channel in communication with said end surface and said transverse opening, the intersection of said channel and said opening defining a shoulder, said draw bolt being positioned in said channel with the head of said bolt in said opening, the head of said bolt applying pressure to said shoulder to maintain said post in secure engagement, the head of said bolt being accessible through said connecting wall for adjusting the threaded engagement.

29. A connection comprising a first post having a longitudinally extending side wall including two spaced opposed longitudinal flanges defining a longitudinal slit therebetween, a second post having an end surface, at least a part of said end surface abutting said side wall of said first post, clamping means securing said posts in abutting engagement, said clamping means including a clamping block and a draw bolt in threaded engagement therewith, at least a portion of said block being in said slit and seated behind said flanges, said second post having two spaced apart walls and a connecting wall, said connecting wall having a transverse opening therein near said end surface, said second post having a longitudinal channel in communication with said end surface and said transverse opening, the intersection of said channel and said opening defining a shoulder, said draw bolt being positioned in said channel with the head of said bolt in said opening, the head of said bolt applying pressure to said shoulder to maintain said posts in secure engagement, the head of said bolt being accessible through said connecting wall for adjusting the threaded engagement, the head of said draw bolt having an axial recess for reception of a tool for rotating said bolt, said recess having the general shape of a regular polygon.

30. A connection comprising a first post having a side wall including two spaced opposed longitudinal flanges defining a longitudinal slit therebetween, a second post having two longitudinal side walls and an end surface, at least a part of said end surface abutting said side wall of said first post, clamping means securing said posts in abutting engagement, said clamping means including a clamping block and a draw bolt in threaded engagement therewith, at least a portion of said block being in said slit and seated behind said flanges, said bolt extending between said side walls of said second post, and means between said side walls for seating the head of said bolt, the head of said bolt being accessible through at least one of the sides of said second post for adjusting the threaded engagement, said first post and second post having the same cross-sectional shape and the head of the draw bolt having an axial recess for reception of a tool for rotating said bolt, said recess having the general shape of a regular polygon.

References Cited in the file of this patent

UNITED STATES PATENTS

| | | |
|---|---|---|
| 167,118 | Pritchett | Aug. 24, 1875 |
| 550,614 | Hewitt | Dec. 3, 1895 |
| 619,416 | Hunter | Feb. 14, 1899 |
| 2,242,427 | Heanue | May 20, 1941 |
| 2,611,633 | Webster | Sept. 23, 1952 |
| 2,696,139 | Attwood | Dec. 7, 1954 |
| 2,762,398 | Adam | Sept. 11, 1956 |

FOREIGN PATENTS

| | | |
|---|---|---|
| 3,164 | Great Britain | 1896 |
| 297,786 | Switzerland | June 16, 1954 |